United States Patent
Buras et al.

(10) Patent No.: US 7,824,485 B2
(45) Date of Patent: Nov. 2, 2010

(54) ASPHALT COMPOSITIONS AND THE PREPARATION THEREOF

(75) Inventors: Paul J. Buras, West University Place, TX (US); William Lee, Humble, TX (US); James R. Butler, League City, TX (US)

(73) Assignee: Fina Technology, Inc., Houston, TX (US)

( * ) Notice: Subject to any disclaimer, the term of this patent is extended or adjusted under 35 U.S.C. 154(b) by 134 days.

(21) Appl. No.: 12/027,079

(22) Filed: Feb. 6, 2008

(65) Prior Publication Data

US 2008/0141899 A1 Jun. 19, 2008

Related U.S. Application Data

(63) Continuation of application No. 11/251,018, filed on Oct. 14, 2005, now Pat. No. 7,341,624.

(60) Provisional application No. 60/619,191, filed on Oct. 15, 2004.

(51) Int. Cl.
*C08L 95/00* (2006.01)
*C09D 195/00* (2006.01)

(52) U.S. Cl. .................. 106/284.3; 106/274; 106/275; 106/284.02; 106/284.1; 106/284.2; 524/59; 524/68

(58) Field of Classification Search ............... 106/274, 106/275, 284.02, 284.1, 284.2, 284.3; 524/59, 524/68
See application file for complete search history.

(56) References Cited

U.S. PATENT DOCUMENTS

| 5,611,910 | A | 3/1997 | Marzari | |
|---|---|---|---|---|
| 6,228,909 | B1 | 5/2001 | Baumgartner | |
| 6,414,056 | B1 | 7/2002 | Puzic | |
| 6,713,539 | B2 * | 3/2004 | Guo et al. ............. | 524/68 |
| 7,341,624 | B2 * | 3/2008 | Buras et al. .......... | 106/274 |
| 2004/0074812 | A1 | 4/2004 | Cullen | |
| 2005/0115461 | A1 | 6/2005 | Dupuis | |

* cited by examiner

*Primary Examiner*—David M Brunsman
(74) *Attorney, Agent, or Firm*—Tenley R. Krueger

(57) ABSTRACT

Asphalt compositions and methods of forming such are described herein. The asphalt compositions and methods of forming such are generally adapted to enable open air processing while producing asphalt compositions that exhibit properties capable of meeting SUPERPAVE™ specifications.

9 Claims, No Drawings

ASPHALT COMPOSITIONS AND THE PREPARATION THEREOF

CROSS-REFERENCE TO RELATED APPLICATIONS

This application is a continuation of U.S. application Ser. No. 11/251,018, filed Oct. 15, 2005, now issued as U.S. Pat. No. 7,341,624. This application was filed while the parent application, U.S. application Ser. No. 11/251,018, was still pending. This application also claims priority to co-pending U.S. Patent Application Ser. No. 60/619,191, filed on Oct. 15, 2004.

FIELD

Embodiments of the present invention generally relate to asphalt compositions and methods of forming the same.

BACKGROUND

Unfortunately, asphalt processing may cause the release of byproducts, such as hydrocarbons, hydrogen sulfide, nitrogen oxide and carbon monoxide, for example. These byproducts may be formed in a number of ways. For example, hydrogen sulfide ($H_2S$) may be formed as a result of sulfur additions used during crude fraction processing or as a result of sulfur present in the crude fraction being processed, such as sour crude fractions, for example.

Further, the Strategic Highway Research Program (SHRP) was established in 1987 to improve the performance and durability of United States roads and to make those roads safer for both motorists and highway workers. One of the results of SHRP was the development of the Superior Performing Asphalt Pavements (SUPERPAVE™) specifications for asphalts. The SUPERPAVE™ system specifies materials characterization techniques and results thereof for the performance certification of asphalt.

By specifying acceptable limits for the characterization results, rather than any particular composition, the SUPERPAVE™ specifications are material independent. Thus, an end user can require that asphalt meets a particular SUPERPAVE™ specification and be reasonably confident that installed asphalt will perform satisfactorily, without regard to the specific crude oil source or other compositional parameters. Such specifications enable control of asphalt characteristics, such as rutting, low temperature cracking and fatigue cracking, for example.

As a result, it is desired to develop an asphalt composition and method of forming such that meets both EPA and SUPERPAVE™ specifications in a cost-effective manner.

SUMMARY

Embodiments of the invention generally include asphalt compositions. In one embodiment, the asphalt compositions generally include a base asphalt, an emissions reducing additive, an acid and a polymer.

In another embodiment, the asphalt composition includes a base asphalt and a polymer. In addition, the asphalt composition is suitable for processing in open air vessels while maintaining suitable characteristics.

Embodiments of the invention further include method of forming asphalt compositions. In one embodiment, the method generally includes blending an acid with an asphalt to form an acid modified asphalt and blending the acid modified asphalt with a polymer to form the asphalt composition.

In another embodiment, the method generally includes blending an acid and an asphalt to form an asphalt composition, at least a portion of the blending occurring in the presence of an oxygen containing gas.

DETAILED DESCRIPTION

Introduction and Definitions

A detailed description will now be provided. The appended claims define an invention, which for infringement purposes is recognized as including equivalents to the various elements or limitations specified in the claim. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Various terms as used herein are shown below. To the extent a term used in a claim is not defined below, it should be given the broadest definition persons in the pertinent art have given that term as reflected in printed publications and issued patents. To the extent that ranges of values are used in the claims or description below, it should be understood that any upper limit, lower limit and/or points that lie therein may be independently combined to define an embodiment of the invention.

As used herein, the term "crosslinking agent" refers to an additive used to introduce mechanical links and/or chemical bonds to a chemical compound.

The term "asphalt" means any asphalt bottoms fi-action, as well as naturally occurring asphalts, tars and pitches and may be used interchangeably herein with the term "bitumen." The term "asphaltic concrete" means asphalt used as a binder with appropriate aggregate added, typically for use as a paving material.

The term "bottoms fraction" refers to a crude fraction having a flash point of about 70° F. or greater.

The term "crude fraction" refers to any of the various refinery products produced from crude oil, either by atmospheric distillation or vacuum distillation, including fractions that have been treated by hydrocracking, catalytic cracking, thermal cracking or coking and those that have been desulfurized.

The term "processing" is not limiting and includes agitating, mixing, milling, blending and combinations thereof all of which are used interchangeably herein. The processing occurs in one or more vessels, such vessels being known to one skilled in the art.

The dynamic shear stiffness is measured by the maximum temperature at which the shear stiffness modulus divided by the sine of the phase angle is at least 1.0 kPa measured on unaged binder or at least 2.2 kPa measured on a rolling thin film residue by a dynamic shear rheometer (e.g., AASHTO TP5-93 test.)

The storage stability is the measure of phase separation over a specified time period, such as 2 to 3 days, for example, at a specified elevated temperature, such as 160° C., for example. The phase separation is measured by the continuity of a top portion and a bottom portion. The phase separation is continuous if the temperature which corresponds to 1.0 kPa binder stiffness from the top and bottom portions is within 2° C. (e.g., AASHTO TP5 test.)

The low temperature stiffness is measured by AASHTO TP1.

Embodiments of the invention described herein generally include asphalt compositions and methods of forming the same.

The asphalt composition may include at least 80 wt. % base asphalt, at least 90 wt. % base asphalt or at least 95 wt. % base asphalt, for example.

The base asphalt may be any suitable petroleum asphalt, asphaltic residue or combinations thereof. The base asphalts may be obtained from deep vacuum distillation of crude oil, resulting in a bottom product having a desired viscosity or from a solvent deasphalting process of the crude oil that yields a demetalized oil, a resin fraction, an asphaltene fraction or combinations thereof, for example. The crude oil may be any crude oil, such as sweet crude, sour crude, heavy crude, light crude, aromatic crude, napthenic crude or combinations thereof for example.

Polymer modified asphalts generally exhibit higher viscosities and melting points than asphalt compositions that do not include a polymer, for example. Therefore, the asphalt compositions described herein may include from about 0.01 wt. % to about 15 wt. % polymer or from about 0.01 wt. % to about 6 wt. % polymer, for example.

The polymer may include any suitable organic polymer or polymer containing at least one unsaturated bond, for example. In one embodiment, the polymer includes block copolymers and/or elastomeric polymers (e.g., butyl rubber, polybutadiene, polyisoprene, polyisobutene, ethylene/vinyl acetate copolymer, polychloroprene, polynorbornene, nylon, polyvinyl chloride, polyethylene, polystyrene, polypropylene, fluorocarbon resin, polyurethane, acrylate resin, such as polyacrylate and/or methacrylate, phenolic, alkyd, polyester, ethylene-propylene-diene and copolymers of styrene and conjugated dienes, such as styrene-butadiene-styrene and styrene-butadiene rubber.)

The asphalt composition includes an acid. Such acid modification of the asphalt generally results in asphalt compositions that exhibit improved low temperature performance, for example. The asphalt composition includes less than about 5 wt. % acid and may include from about 0.01 wt. % to about 4.5 wt. % acid, or from about 0.05 wt. % to about 2 wt. % acid or from about 0.1 wt. % to about 1 wt. % acid, for example.

The acid may be any suitable inorganic acid, organic acid or combinations thereof. In one embodiment, the acid is mineral acid, such as sulfuric acid, nitric acid, hydrochloric acid, phosphoric acid or combinations thereof. In one embodiment, the acid has an $H_3PO_4$ equivalent concentration of greater than 100%. For example, the acid may be polyphosphoric acid ($H_{n+2}P_nO_{3n+1}$, wherein n is greater than 1), which may have an $1H_3PO_4$ of 115 or 117, for example. In another embodiment, the acid is superphosphoric acid ($H_{3.3}P_{1.3}O_5$), having an $H_3PO_4$ of 105. Unlike phosphoric acid, superphosphoric and polyphosphoric acid are not water-based and exhibit very low to no corrosivity. Such low water content and corrosivity generally provides easier processability in hot asphalt.

The asphalt composition may further include additives, such as sulfonating agents, crosslinking agents or combinations thereof, for example. The asphalt composition may include from about 0.001 wt. % to about 5 wt. % of total additives or from about 0.01 wt. % to about 3 wt. % of total additives, for example.

In one embodiment, the asphalt composition includes an emissions reducing additive. The emissions reducing additive generally includes a metal oxide. In one embodiment, the metal oxide is a transition metal oxide, such as zinc oxide, copper oxide, iron oxide, aluminum oxide or combinations thereof, for example.

The crosslinking agents may be activators (e.g., zinc oxide), accelerators, such as sulfur compounds (e.g., mercaptobenzothizole (MBT)) or both accelerators and activators, such as a zinc salt of MBT, for example. In one embodiment, the crosslinking agent is a metal oxide. When used in conjunction with an emissions reducing additive, the crosslinking agent may be the same metal oxide or a different metal oxide than the emissions reducing additive.

The additives may further include unsaturated functional monomers, unsaturated carboxylic acids, unsaturated dicarboxylic acids, unsaturated anhydrides, unsaturated esters, unsaturated amides or combinations thereof, for example.

Unexpectedly, the asphalt compositions described herein are capable of exhibiting superior properties, such as those mandated by the SUPERPAVE™ specifications.

For example, the asphalt composition exhibits storage stability.

The asphalt composition further exhibits thermal cracking resistance. Thermal cracking resistance is generally determined by the low temperature stiffness of the composition.

The asphalt composition also exhibits rutting resistance. Rutting resistance is generally determined by the Dynamic Shear Stiffness of the composition at elevated temperatures.

It is possible to adjust the physical properties of the asphalt composition by varying the amount of each element in the composition.

The asphalt compositions described herein are capable of formation in any manner known to one skilled in the art, while maintaining their superior physical properties. However, such compositions are also capable of formation through open tank processes. Unexpectedly, when the emissions reducing additive is utilized, the asphalt composition may be blended in open air tanks without releasing unacceptable levels of byproducts. Further, the asphalt composition can be exposed to oxygen containing gases at any point in the process without detrimental effects. In one embodiment, the asphalt composition is contacted with air for a time of at least 15 minutes (e.g., from about 15 minutes to an indefinite period of time, such as storage), or from about 30 minutes to about 6 hours. In another embodiment, one or more of the mixing vessels is sparged with an oxygen containing gas. For example, the vessel can be sparged with air near the bottom of the vessel at a rate of from about 20 to about 70 L/hr/kg or from about 20 to about 55 L/hr/kg, for example.

Illustrative methods of forming such asphalt compositions are described below, but in no way limit the methods that may be utilized to form such compositions. For example, in one embodiment, asphalt is heated in a first mixing vessel to a temperature of from about 300° F. to 400° F. Upon heating, the polymer is introduced to the first mixing vessel to form an asphalt concentrate, which is blended in the presence of air. For example, the asphalt concentrate can be blended in an open air vessel for a time sufficient to provide adequate mixing, such as from about 5 minutes to about 2 hours. "Asphalt concentrate" refers to a polymer rich asphalt mixture, such as an asphalt mixture having from about 5 wt. % to about 12 wt. % polymer.

The asphalt concentrate may then be transferred to a second mixing vessel or remain in the first mixing vessel. At such time, additional asphalt is added to the asphalt concentrate to form a dilute asphalt. The "dilute asphalt" generally has a lower polymer concentration than that of the asphalt concentrate, such as from about 0.1 wt. % to about 5 wt. % polymer, or from about 0.1 wt. % to about 2 wt. % polymer. The dilution asphalt can be the same, slightly different or completely different asphalts. In this embodiment, the acid is added to the second mixing vessel at the same time as the additional asphalt. The acid is added in a timed release sufficient to avoid foaming, such as from about 20 minutes to about 1 hour, for example.

Alternatively, the acid can be added to the asphalt concentrate prior to the additional asphalt. In one embodiment, the acid is added to the asphalt prior the polymer and then the resultant concentrate is diluted. As described above, the acid can be added at any point in the process and to any vessel or conduit in the process. For example, the acid can be added to a first or second mixing vessel or to a conduit operably connecting the first and second mixing vessels.

The additives can be added to any vessel at any time throughout the process. For example, metal oxides can be added to the first asphalt prior to polymer or acid addition. In one embodiment, elemental sulfur, in some instances functioning as a crosslinking agent, is added to the asphalt concentrate, either separate or at the same time as the additional asphalt. In such an embodiment, the asphalt is contacted with sulfur in an environment capable of evacuating the sulfur compounds emitted, such as $H_2S$, to emissions abatement.

In an alternative embodiment, the process may include forming a polymer free asphalt composition, i.e., an asphalt composition including essentially 0 wt. % polymer. In such an embodiment, the polymer addition step is eliminated from the processes described herein.

Product Applications

The asphalt compositions described herein can be used for many applications, such as road paving, sealing, water proofing, asphalt cement and/or roofing, for example.

EXAMPLES

Example 1

An asphalt composition (94.8 wt. % asphalt, 4.5 wt. % styrene-butadiene-styrene block copolymer, 0.2 wt. % zinc oxide, 0.1 wt. % sulfur, 0.1 wt. % MBT and from 0.3 to 0.6 wt. % polyphosphoric acid) was formed by the following:

Zinc oxide was added to asphalt stored in a vessel at 325° F. Super phosphoric acid was then added and the resultant compound was agitated in the presence of air to form a substantially uniform mixture.

Such mixture was then pumped to a blending vessel and heated to a temperature of about 350° F. Styrene-Butadiene-Styrene block copolymer was then added to the blending vessel to form an asphalt concentrate milled to disperse the polymer throughout the asphalt in the presence of air. The resultant concentrate was then transferred to a closed blending tank and diluted with additional asphalt to form a 4.5 wt. % polymer solution. Sulfur and MBT were then added to the asphalt mixture to form the resulting asphalt composition.

Hypothetical Example 2

The same asphalt composition will be formed by the following:

Zinc oxide will be added to asphalt stored in a vessel at 325° F. The mixture will be agitated in the presence of air to form a substantially uniform mixture and heated to a temperature of about 350° F. Styrene-Butadiene-Styrene block copolymer (12 wt. %) will then be added to the vessel and the concentrate milled to disperse the polymer throughout the asphalt. The resultant concentrate will be diluted with additional asphalt to form a 3 wt. % polymer solution. Sulfur and MBT will then be added to the asphalt mixture prior to the addition of super phosphoric acid to form the resulting asphalt composition.

The asphalt composition will then be further diluted to form a 2 wt. % polymer modified asphalt (PMA) composition. The PMA will be combined with aggregate to form a paving composition.

What is claimed is:

1. An asphalt composition made by a plurality of steps comprising:
   heating a base asphalt to a temperature of from 300° F. to 400° F.;
   introducing a polymer to form an asphalt concentrate and blending the asphalt concentrate, wherein said concentrate has from 5 wt. % to 12 wt. % of the polymer;
   adding zinc oxide before or after the polymer and before any mineral acid, and further blending the concentrated asphalt;
   adding a mineral acid, and further blending the concentrated asphalt; and
   wherein at least a portion of one or more of the blendings after the zinc oxide addition occurs in the presence of an oxygen containing gas.

2. The asphalt composition of claim 1, wherein the asphalt concentrate is blended in the presence of air for from 5 minutes to 2 hours.

3. The asphalt composition of claim 1, further comprised of from 0.001 wt. % to 5 wt. % of additives selected from the group consisting of sulfonating agents, cross-linking agents, emissions reducing additives, and combinations thereof and wherein said additives are at least comprised of sulfur and mercaptobenzothizole (MBT).

4. The asphalt composition of claim 1, wherein additional base asphalt is added to the concentrate to form a diluted asphalt, wherein the diluted asphalt is comprised of at least 90 wt. % base asphalt, from 0.1 wt. % to 5 wt. % of the polymer, and from 0.01 wt. % to 2 wt. % of the acid.

5. The asphalt composition of claim 1, wherein the acid is comprised of polyphosphoric acid.

6. The asphalt composition of claim 1, wherein the acid is a phosphoric acid having a $H_3PO_4$ equivalent concentration of greater than 100%.

7. The asphalt composition of claim 1, wherein the phosphoric acid is selected from polyphosphoric acid, superphosphoric acid and combinations thereof.

8. The asphalt composition of claim 1, wherein the acid is comprised of sulfuric acid, nitric acid, hydrochloric acid, phosphoric acid or combinations thereof.

9. The asphalt composition of claim 1, wherein the polymer is milled to disperse the polymer throughout the asphalt, and wherein at least a portion of the milling occurs in the presence of air.

* * * * *